May 5, 1959  N. B. F. HOLLANDER  2,884,740
CONTAINER FOR CULTIVATING KERNELS AND SEEDS
Filed May 2, 1957
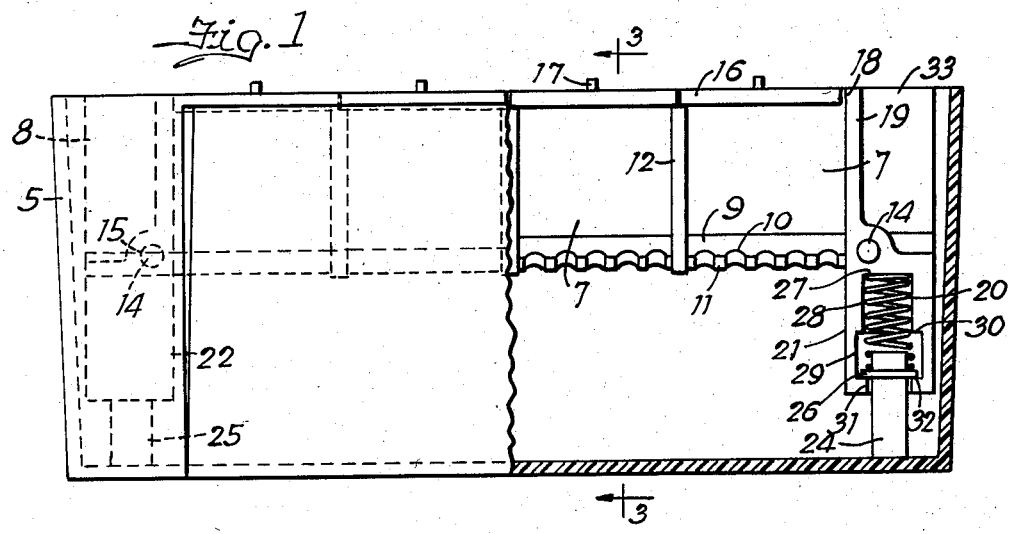
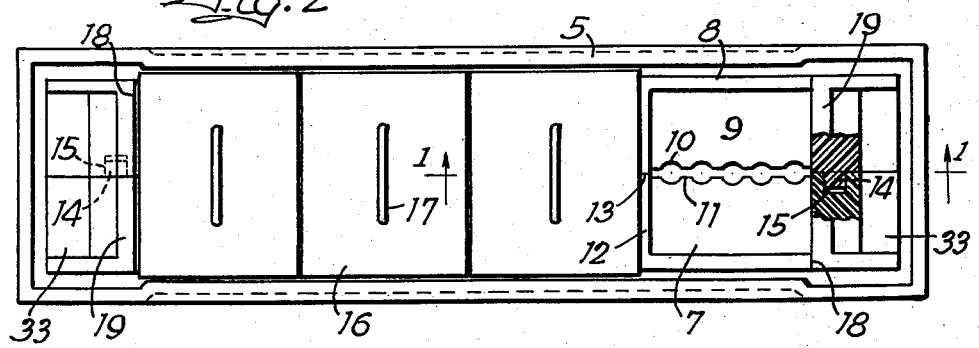
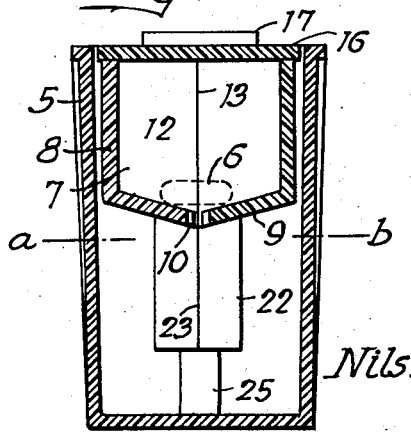
Inventor
Nils Bertil Fredrik Hollander United States Patent Office 2,884,740
Patented May 5, 1959

2,884,740

CONTAINER FOR CULTIVATING KERNELS AND SEEDS

Nils Bertil Fredrik Hollander, Stockholm, Sweden, assignor to Testor Chemical Co., Rockford, Ill., a corporation of Illinois Application May 2, 1957, Serial No. 656,668

8 Claims. (Cl. 47—1.2)

This invention relates to a kernel and seed germinator and plant container.

It is well known that soil may be excluded in the cultivation of kernels, seeds, and the like, and that sand, gravel and other materials can be substituted if a suitable nutritive solution is added. It is, therefore, the principal object of my invention to provide a transparent container having housed therein a case made in two or more parts of transparent material having recesses provided therein to accommodate the kernels or seeds at the most advantageous level from the standpoint of encouraging cultivation and growth, the case being supported on springs at a predetermined elevation above the level of nutritive solution in the container and adapted to be depressed to a predetermined limited extent for intermittent wetting of the kernels or seeds, or resulting plants, with the solution, the transparency of the container and case therein enabling one to check the progress of cultivation and growth from time to time without disturbing or in any way altering the ideal conditions provided for same. Thus, the invention will find use as instruction material in schools, and seed experiment laboratories, as well as in the homes and hospitals and other institutions, where it will be found to be of particular interest to shut-ins.

The invention is illustrated in the accompanying drawing, in which

Fig. 1 is a view partly in side elevation and partly in longitudinal section on line 1—1 of Fig. 2 of a complete unit embodying my invention;

Fig. 2 is a plan view with the cover on one chamber removed to better illustrate the construction and with the dowel connection between the halves of the case at the adjacent end shown in horizontal section, and Fig. 3 is a cross-section on the line 3—3 of Fig. 1.

The same reference numerals are applied to corresponding parts in these three views.

Referring to the drawing, the reference numeral 5 designates a container made of clear plastic material so that the kernels or seeds, like that indicated at 6 in Fig. 3 in one of the chambers 7 formed between the halves of the case 8, that is likewise made of clear plastic material, may be easily seen through the walls of the container, thus enabling one without disturbing anything to note the progress of the cultivation and growth from time to time, and making such a unit of great value in schools, laboratories, and various institutions, as well as in the homes. The downwardly inclined bottom walls 9 of the chambers 7 have registering semi-circular grooves 10 of small radius in relation to the size of the kernels or seeds 6 provided in the inner edges 11 thereof, these edges being preferably spaced slightly, as seen in Figs. 2 and 3, to facilitate inflow and egress of solution and also provide the space required for roots to extend downwardly. However, the vertical side walls 12 of the chambers 7 formed in the two halves of the case have abutment at their inner edges, as indicated at 13, so that the chambers 7 are definitely separated from one another, that being considered important from the standpoint of enabling keeping close tab on the progress of cultivation and growth of different kinds of kernels or seeds and their resulting plants, inasmuch as the user may wish to reserve one or two of the four chambers 7 for one variety or species and another chamber or chambers for another variety or species, and may wish to compare and keep track of their relative progress. A dowel pin projection 14 is provided on one end of each case half and a mating socket 15 is provided in the other end, so that when two identical molded case halves are put together the dowel projections 14 on the two halves fit neatly in the sockets 15, as shown in Fig. 2, holding the halves in register. Removable covers 16, preferably of clear plastic material, like that of the container 5 and case 8, are provided for the four compartments 7, each having its individual handle 17 on the top. Shoulders 18 are defined at the opposite ends of the case by end walls 19 extending a bit higher than walls 12 between the chambers and forming one side of the endmost chambers 7, thus permitting sliding the covers 16 from one chamber to another when one of the covers is removed. When all of the covers are in place, the shoulders 18 on the case 8 hold the covers against displacement endwise with respect to the case while the side walls of the container 5 prevent displacement in a transverse direction.

The container 5 is filled to the level ab (Fig. 3) with a suitable nutritive solution and, in accordance with my present invention, the case 8 is yieldingly supported on springs 20 provided in the hollow cylindrical bosses 21 and 22 provided on the opposite ends of the case, half on each case half, as indicated by the division line 23 in Fig. 3, in the plane of the line 13. Plungers 24 and 25 support the springs on the bottom of the container 5 and have annular flanges 26 provided thereon near their upper ends on which the lower ends of the springs 20 are seated, the upper ends of the springs having abutment at 27 in the upper ends of bores 28 provided in the bosses 21 and 22. The bores 28 have enlarged lower end portions 29 to accommodate the annular flanges 26, and the annular shoulders 30 defined between the bores 28 and 29 serve as limit stops for engagement by flanges 26 to prevent more than a predetermined amount of depression of the case 8 when the kernels or seeds 6, or resulting plants, are to be wetted by dunking. The plungers 24 and 25 work in openings 31 in the lower ends of bosses 21 and 22 and the annular shoulders 32 defined by these end walls have abutment with the flanges 26 to limit outward movement of the plungers under spring pressure. Obviously, the plungers 24 and 25 and springs 20 are assembled in one half of the case 8 before the other case half is applied. If desired, a suitable cement may be provided in the sockets 15 to permanently secure the case halves together when the dowel pin projections 14 are entered in the sockets, but usually that is not done. The open chambers 33 defined in the ends of the case above the bosses 21 and 22 provide convenient filler openings for the addition of water or nutritive solution.

In operation, the kernels or seeds 6 of one, two, three or four kinds are placed in the various chambers 7 and nutritive solution is maintained at the level ab below the bottoms of the chambers, and, at suitable intervals—say, once a day—the case 8 is depressed by hand as far as the plungers 24 and 25 will permit, whereby to immerse all of the kernels or seeds simultaneously with the nutritive solution. Of course, the case returns immediately to the upper level shown when the pressure thereon is relieved, allowing all excess solution to drain back into the container from the bottoms of the various chambers 7. The covers 16 serve to reduce evaporation of the solution and also tend to discourage youngsters from tampering with the kernels or seeds. The clear plastic material of the container 5 and case 8 and covers 16 permits easy visibility of the seeds or kernels at all times. The chambers 7 are of sufficient depth to allow a good amount of sprouting before it is necessary to remove the covers 16. By the time that occurs, roots will also have formed extending downwardly through the openings 10—11, reaching into the nutritive solution so that the dunking, if continued at all, may be done at longer intervals, or as the progress of growth indicates is necessary or desirable.

It is believed the foregoing description conveys a good understanding of the objects and advantages of my invention. The appended claims have been drawn to cover all legitimate modifications and adaptations.

I claim:

1. As an article of manufacture, an open-top container of transparent material adapted to be filled with liquid to a predetermined level, a case insertable with a loose fit inside said container so as to be guided for straight up and down movement with respect to said container and having an open-top chamber provided therein, the bottom of which is normally at a level above the level of the liquid in the container and has a restricted opening provided therein for passage of liquid into and out of the same while retaining a seed or kernel, resilient means for supporting said case at said elevation in said container but permitting depression thereof manually into the liquid, and means combined with said resilient means positively limiting depression and return movement of said case.

2. A device of the character described comprising an open-top container, a case insertable with a loose fit inside said container having a plurality of open-top chambers provided therein, the bottoms of which are at a common level normally above the level of the liquid in the container and have restricted openings provided therein for passage of liquid into and out of the same while retaining seeds or kernels, resilient means for supporting said case at said elevation in said container but permitting depression thereof manually into the liquid, and means positively limiting depression and return movement of said case.

3. As an article of manufacture, an open-top container of transparent material adapted to be filled with liquid to a predetermined level, a case also made of transparent material insertable with a loose fit inside said container having an open-top chamber provided therein, the bottom of which is normally at a level above the level of the liquid in the container and has a restricted opening provided therein for passage of liquid into and out of the same while retaining a seed or kernel, and resilient means for supporting said case at said elevation in said container but permitting depression thereof into the liquid, said case being split longitudinally in a vertical plane substantially through the middle thereof and having means for holding the halves together in registering relationship.

4. As an article of manufacture, an open-top container of transparent material adapted to be filled with liquid to a predetermined level, a case also made of transparent material insertable with a loose fit inside said container having a plurality of open-top chambers provided therein, the bottoms of which are at a common level normally above the level of the liquid in the container and have restricted openings provided therein for passage of liquid into and out of the same while retaining seeds or kernels, and resilient means for supporting said case at said elevation in said container but permitting depression thereof into the liquid, said case being split longitudinally in a vertical plane substantially through the middle thereof and having means for holding the halves together in registering relationship.

5. As an article of manufacture, an open-top container of transparent material adapted to be filled with liquid to a predetermined level, a case also made of transparent material insertable with a loose fit inside said container having an open-top chamber provided therein, the bottom of which is normally at a level above the level of the liquid in the container and has a restricted opening provided therein for passage of liquid into and out of the same while retaining a seed or kernel, and resilient means for supporting said case at said elevation in said container but permitting depression thereof into the liquid, said case being split longitudinally in a vertical plane substantially through the middle thereof and having registering recesses provided in the abutting faces of the halves, the resilient supporting means including a spring assembled in said registering recesses and a plunger also assembled in said recesses with said spring, the spring having abutment at one end in the upper ends of the recesses and at its lower end on said plunger, and said plunger extending from said recesses and having abutment with the bottom of the container.

6. As an article of manufacture, an open-top container of transparent material adapted to be filled with liquid to a predetermined level, a case also made of transparent material insertable with a loose fit inside said container having a plurality of open-top chambers provided therein, the bottoms of which are at a common level normally above the level of the liquid in the container and have restricted openings provided therein for passage of liquid into and out of the same while retaining seeds or kernels, and resilient means for supporting said case at said elevation in said container but permitting depression thereof into the liquid, said case being split longitudinally in a vertical plane substantially through the middle thereof and having registering recesses provided in the abutting faces of the halves, the resilient supporting means including springs assembled in said registering recesses and plungers also assembled in said recesses with said springs, the springs having abutment at one end in the upper ends of the recesses and at their lower end on said plungers, and said plungers extending from said recesses and having abutment with the bottom of the container.

7. As an article of manufacture, an open-top container of transparent material adapted to be filled with liquid to a predetermined level, a case also made of transparent material insertable with a loose fit inside said container having an open-top chamber provided therein, the bottom of which is normally at a level above the level of the liquid in the container and has a restricted opening provided therein for passage of liquid into and out of the same while retaining a seed or kernal, and resilient means for supporting said case at said elevation in said container but permitting depression thereof into the liquid, said case being split longitudinally in a vertical plane substantially through the middle thereof and having registering recesses provided in the abutting faces of the halves, the resilient supporting means including a spring assembled in said registering recesses and a plunger also assembled in said recesses with said spring, the spring having abutment at one end in the upper ends of the recesses and at its lower end on said plunger, and said plunger extending from said recesses and having abutment with the bottom of the container, the plunger having an annular flange provided on its upper end portion for support of the lower end of said spring and arranged to engage annular shoulders provided in said recesses to limit reciprocatory movement of the plunger and accordingly limit depression of the case.

8. As an article of manufacture, an open-top container of transparent material adapted to be filled with liquid to a predetermined level, a case also made of transparent material insertable with a loose fit inside said container having a plurality of open-top chambers provided therein, the bottoms of which are at a common level normally above the level of the liquid in the container and have restricted openings provided therein for passage of liquid into and out of the same while retaining seeds or kernals, and resilient means for supporting said case at said elevation in said container but permitting depression thereof into the liquid, said case being split longitudinally in a vertical plane substantially through the middle thereof and having registering recesses provided in the abutting faces of the halves, the resilient supporting means including springs assembled in said registering recesses and plungers also assembled in said recesses with said springs, the springs having abutment at one end in the upper ends of the recesses and at their lower end on said plungers, and said plungers extending from said recesses and having abutment with the bottom of the container, the plungers having annular flanges provided on their upper end portions for support of the lower ends of said springs and arranged to engage annular shoulders provided in said recesses to limit reciprocatory movement of the plungers and accordingly limit depression of the case.

References Cited in the file of this patent

UNITED STATES PATENTS

| | | |
|---|---|---|
| 53,477 | Perry | Mar. 27, 1866 |
| 726,766 | Schaefer | Apr. 28, 1903 |
| 2,281,068 | Farnham | Apr. 28, 1942 |
| 2,720,725 | Peerless | Oct. 18, 1955 |

FOREIGN PATENTS

| | | |
|---|---|---|
| 736,078 | France | Sept. 12, 1932 |
| 7,507 | Great Britain | of 1902 |
| 566,529 | Great Britain | Jan. 2, 1945 |

OTHER REFERENCES

Publication: Gwosch, German application Serial No. G12545, printed March 15, 1956 (Klasse 45F–26).